(12) United States Patent
Schuebel et al.

(10) Patent No.: US 9,926,980 B2
(45) Date of Patent: Mar. 27, 2018

(54) SEALING SLEEVE WITH COMBINED AXIAL BEARING AND AUTOMATIC TRANSMISSION OR CLUTCH WITH SUCH A SEALING SLEEVE

(71) Applicant: Schaeffler Technologies AG & Co. KG, Herzogenaurach (DE)

(72) Inventors: Rainer Schuebel, Aurach (DE); Georg von Petery, Wiesenbronn (DE); Frank Beeck, Erlangen (DE); Franz Kurth, Nuremberg (DE); Alexander Reimchen, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/228,704

(22) Filed: Aug. 4, 2016

(65) Prior Publication Data
US 2017/0037906 A1    Feb. 9, 2017

(30) Foreign Application Priority Data
Aug. 7, 2015    (DE) .......................... 10 2015 215 113

(51) Int. Cl.
*F16C 33/46*    (2006.01)
*F16C 33/58*    (2006.01)
(Continued)

(52) U.S. Cl.
CPC ........ *F16C 33/7893* (2013.01); *F16C 19/305* (2013.01); *F16C 33/581* (2013.01);
(Continued)

(58) Field of Classification Search
CPC ........ F16C 19/30; F16C 19/305; F16C 19/44; F16C 19/46; F16C 19/463; F16C 19/466;
(Continued)

(56) References Cited

U.S. PATENT DOCUMENTS 2,236,481 A * 3/1941 Storz ....................... F16C 19/46
29/898.063
2,891,828 A * 6/1959 Winchell ................. F16C 19/30
384/621

(Continued)

FOREIGN PATENT DOCUMENTS

DE          10313183         2/2004
DE          102011006293 A1  10/2012
DE          102011083046 A1  3/2013

*Primary Examiner* — Phillip A Johnson
(74) *Attorney, Agent, or Firm* — Simpson & Simpson, PLLC

(57) ABSTRACT

A sealing sleeve for a transmission or a clutch of a motor vehicle for use between two torque transmitting devices, which rotate relative to each other, wherein a shell surface of the sealing sleeve is designed for making contact in a sliding and sealing manner with one or more sealing means; and a flange section, which projects radially from the shell surface, is designed for interpositioning between the two torque transmitting devices, wherein the flange section is formed as a running surface for an axial bearing. An automatic transmission or a clutch with a first torque transmitting device and a second torque transmitting device, between which an inventive sealing sleeve is inserted.

19 Claims, 1 Drawing Sheet

(51) Int. Cl.
  *F16C 33/78* (2006.01)
  *F16C 19/30* (2006.01)
  *F16C 33/66* (2006.01)

(52) U.S. Cl.
  CPC ........ *F16C 33/588* (2013.01); *F16C 33/6681* (2013.01); *F16C 2361/43* (2013.01); *F16C 2361/65* (2013.01)

(58) Field of Classification Search
  CPC .. F16C 33/581; F16C 33/588; F16C 33/6881; F16C 33/7893; F16C 2361/43; F16C 2361/65
  See application file for complete search history.

(56) References Cited

U.S. PATENT DOCUMENTS

| | | | | |
|---|---|---|---|---|
| 3,981,549 | A | * | 9/1976 | Carullo .................. F16C 19/30 384/622 |
| 7,963,703 | B2 | * | 6/2011 | Takamizawa ........... F16C 19/32 384/455 |
| 2003/0190106 | A1 | * | 10/2003 | Schwab .................. F16C 19/30 384/620 |
| 2008/0017469 | A1 | | 1/2008 | Iwasaki et al. |
| 2013/0067684 | A1 | * | 3/2013 | Ziegler .................. F16C 33/14 16/2.1 |

* cited by examiner

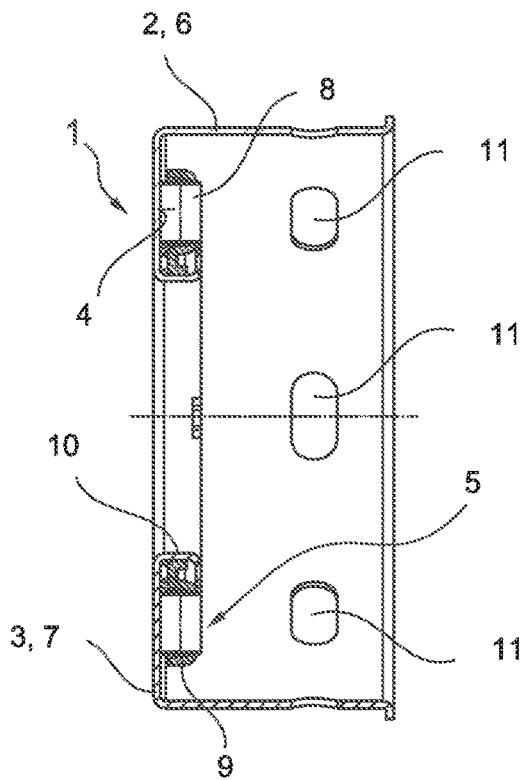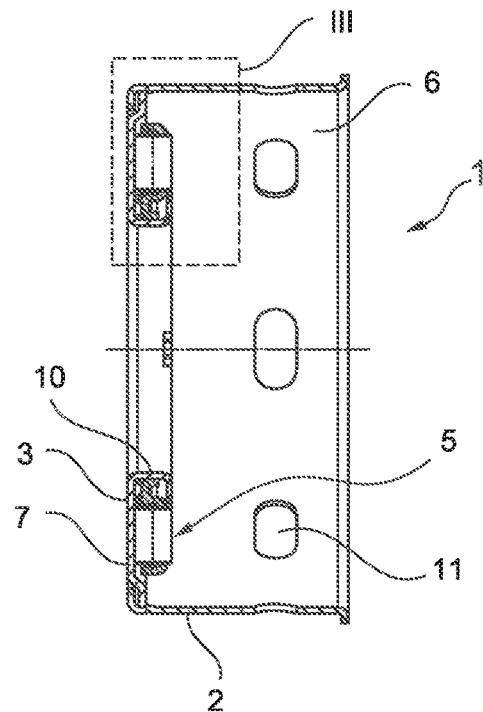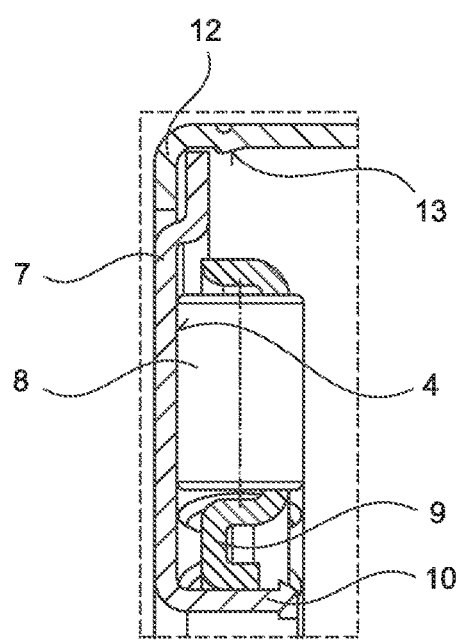
Fig. 1
Fig. 2
Fig. 3

SEALING SLEEVE WITH COMBINED AXIAL BEARING AND AUTOMATIC TRANSMISSION OR CLUTCH WITH SUCH A SEALING SLEEVE

CROSS-REFERENCE TO RELATED APPLICATIONS

The present application claims priority to German Patent Application No. DE 10 2015 215 113.1, filed Aug. 7, 2015, which application is incorporated by reference in its entirety.

TECHNICAL FIELD

The present disclosure relates to a sealing sleeve for a transmission or for a clutch of a motor vehicle for use between two torque transmitting devices, which rotate relative to each other, such as, on the one hand, a hub, which is connected to a shaft in a torsion-proof manner, and, on the other hand, a housing, wherein a shell surface of the sealing sleeve is designed/prepared for making contact in a sliding and sealing manner with one or more sealing means/sealing rings, such as an O-ring or several O-rings; and a flange section, which projects radially from the shell surface, is designed/prepared/provided for interpositioning between the two torque transmitting devices.

BACKGROUND

A sealing sleeve, conforming to its genre, is known from the German published patent application DE 10 2011 006 293 A1 (Ziegler et al.). This publication discloses a sleeve-shaped component and an interference fit assembly, which is formed with the sleeve-shaped component. The interference fit assembly consists of a carrier and at least one stepped sleeve that is seated with an interference fit on the carrier. The stepped sleeve is made by forming a sheet metal material and is characterized by a very thick wall configuration. This thick wall configuration makes it possible to ensure that in the compressed state the stepped sleeve meets close shape tolerances in the functionally relevant regions.

U.S. published patent application 2008/0017469 A1 (Iwasaki et al.) discloses an automatic transmission conforming to its genre. In this case, a drive shaft is disclosed that is connected to a hub in a torsion-proof manner. In contrast to a pin of a housing pin, which rotates relative to the drive shaft with the hub, the shaft is mounted above the axial bearing. Furthermore, two sealing rings, which seal off a fluid chamber, are introduced in the housing pin, so that a multi-plate clutch, which is connected to the hub, can be supplied with hydraulic fluid.

German published patent application DE 10 2011 083 046 A1 (Ziegler et al.) discloses a drawn sleeve, which is designed, in particular, as a raceway bushing for an automatic transmission. The device, disclosed in this patent application, relates to a raceway bushing with a substantially cylindrical peripheral wall that forms a bushing inner surface and a bushing outer surface, and with a bottom wall having an inner and an outer bottom surface, and with a bottom opening, which is formed in the bottom wall, wherein the bottom opening is bordered by an annular collar that rises axially beyond the inner bottom surface.

Typical sealing sleeves are to be used in a sliding and/or sealing manner in a transmission or a clutch of a motor vehicle. A typical automatic transmission has a drive shaft, which is to be mounted in the axial direction, and a hub, which is connected to the drive shaft in a torsion-proof manner.

Unfortunately, although the existing axial bearing points and the sealing sleeves may be placed directly side by side, they are developed and mounted separately. Furthermore, automatic transmissions that work without a sealing sleeve and, as a result, allow the sealing rings to run directly against a surface, for example, a hardened surface of the housing, which is machined with much effort. This machining of the hardened and/or ground surfaces and/or the bores is extremely time-consuming and cost intensive.

BRIEF SUMMARY

According to aspects illustrated herein, there is provided a sealing sleeve for a transmission or for a clutch of a motor vehicle for use between two torque transmitting devices, which rotate relative to each other, wherein a shell surface of the sealing sleeve is designed for making contact in a sliding and sealing manner with one or more sealing means; and a flange section, which projects radially from the shell surface, is designed for interpositioning between the two torque transmitting devices, wherein the flange section is formed as a running surface for an axial bearing.

According to aspects illustrated herein, there is provided an automatic transmission or clutch with a first torque transmitting device and a second torque transmitting device, between which a sealing sleeve is inserted, wherein a shell surface of the sealing sleeve is designed for making contact in a sliding and sealing manner with one or more sealing means; and a flange section, which projects radially from the shell surface, is designed for interpositioning between the two torque transmitting devices, wherein the flange section is formed as a running surface for an axial bearing.

Based on the aforesaid, the object of the present disclosure is to remedy the drawbacks discussed above and to disclose, in particular, a device that avoids the time consuming machining of the surface of the transmission and/or the clutch and at the same time makes possible a modular development and assembly of the various components.

The above object is achieved for a device conforming to its genre by the fact that the flange section is formed and prepared (with respect to material/geometry/by the surface finish) as a running surface for an axial bearing. In this way the axial bearing, which supports a torque transmitting device, such as a drive shaft, in the axial direction, and the sealing sleeve are operatively coupled to each other. This arrangement makes it possible to optimally adapt the two components to each other in their development and their assembly, a feature that reduces the complexity of the existing devices. As a result, the function of the two products is now combined into one device.

Advantageous embodiments are claimed in the dependent claims and explained in greater detail below.

Therefore, it is advantageous if the flange section forms a rolling surface for a rolling body of the axial bearing. Each rolling body may be a roller, a needle, a cone, a barrel and/or a ball. As a result, it is possible to operatively couple the sealing sleeve with an axial rolling bearing, which is designed to compensate for the high axial forces that act in an automatic transmission and/or a clutch. Furthermore, the arrangement facilitates a very space-saving assembly of the axial bearing, a feature that has a positive impact on the installation space.

As soon as the flange section, for example, in the region of an axially extending rim, is connected to a cage of a rolling bearing, this arrangement further increases the compactness of the device. The cage is important for guiding the rolling bodies of the axial bearing. Due to the fact that the cage is accurately connected to the flange section of the sealing sleeve in terms of shape, the objective is achieved that the inventive device is, on the one hand, highly compact and, on the other hand, stable.

Another advantageous embodiment is characterized by the feature that the sealing sleeve is securely connected, i.e., in a torsionally and axially fixed manner, to an axial rolling bearing. As a result, the axial bearing is also integrated into the sealing sleeve in a space saving and compact manner. Thus, the functions of the axial bearing that are separated from each other typically and the function of providing a sealing surface are integral with each other, a feature that reduces the complexity both during assembly and also during the logical handling of the supply chain.

An additional advantage consists of the fact that hydraulic fluid passage openings are contained/introduced in the shell surface of the sealing sleeve. These hydraulic fluid passage openings can be formed as passage slots that are arranged so as to be evenly distributed over the periphery of the sealing sleeve. The hydraulic fluid passage openings make it possible that a fluid chamber having a sealing system that is supported with the aid of the sealing sleeve can still be supplied with hydraulic fluid. The hydraulic fluid passage openings are formed with respect to their geometric shape and size in such a way that they ensure, on the one hand, a reliable supply of hydraulic fluid and, on the other hand, reliably fulfill their sealing properties.

As soon as the sealing sleeve has a constant thickness, in particular, in the region of the sections, which form the shell surfaces, i.e., the sections of the flange section and of the rim, the positive properties will keep apace in terms of the strength of the sleeve, the internal stress distribution and the production. In addition to the cost-effective production, the constant thickness, which is small compared to the length of the sleeve, also still allows, on the one hand, the device to occupy a small installation space and, on the other hand, to be configured so as to reduce the weight and the amount of material required.

Another advantageous embodiment is characterized by the feature that the sealing sleeve is configured in one part or two parts. Due to the fact that the number of components, of which the sealing sleeve is made up, is not fixed, the flexibility of the inventive sealing sleeve is increased. While the one part configuration has advantages, in particular, in terms of the internal flow of forces, the two part configuration leads to a cost-effective production.

It is also advantageous if the flange section and the rim form a bottom unit that resembles a cup, a ring and/or a disk. The bottom unit is designed in such a way that, on the one hand, it occupies the axial bearing in a space saving manner and, on the other hand, defines such an inside diameter that the sealing sleeve can be put on the drive shaft, which is to be axially mounted, without a lot of effort.

If the bottom unit is attached to a sleeve base body, which forms the shell surface, in a non-positive locking manner and/or a positive locking manner and/or by material bonding, the result is a torsionally and axially fixed connection between the bottom unit and the sleeve base body, a feature that leads to an efficient configuration of the two part sealing sleeve. Due to the fact that the flow of forces in both the bottom unit and also in the sleeve base body is known in advance, the two units can be adapted to the forces acting on them, ideally with respect to their choice of material and their surface finish.

Furthermore, the present disclosure relates to an automatic transmission or a clutch with a first torque transmitting device and a second torque transmitting device, between which a sealing sleeve is inserted. As a result, the automatic transmission and/or the clutch is/are mounted, on the one hand, in an axially compact and stable manner and, on the other hand, has/have a sealing surface that makes it possible to dispense with a time-consuming surface machining of the surfaces to be sealed.

It is also advantageous if the inventive sleeve base body and the bottom unit are connected to each other by means of a clip connection. This clip connection is attached preferably to a shoulder of the sleeve base body. This connection is characterized by its simplicity, its compactness and its reliability.

In other words, the present disclosure describes a sealing sleeve, which is combined with an axial bearing and which is used primarily in automatic transmissions of motor vehicles. In this case, the axial bearing and the sealing sleeve are combined in such a way that the function of the two products is now combined into one. At the same time, it is possible to implement the device in one part or by means of a mechanical connection of a two part device.

According to the present disclosure, an axial disk of an axial bearing is replaced by a cup-shaped sleeve. In this case, the bottom of the sleeve has an inner raceway/running surface of such a surface finish that rolling bodies, such as rollers and/or needles of an axial bearing, can run/roll on it. Furthermore, the edge of the cup is provided with holes, through which lubricant or hydraulic fluid can be distributed. The use of the sleeve is also conceivable in transmissions, between two rotating shafts, or between shafts and clutch elements or between shafts and housings or between clutch elements and housings. The range of application for the sealing sleeve described herein also includes sealing surfaces for rotary piston-like slides, which slide linearly on sleeves. Usually in this case the sleeve is pressed in. The machine part and/or the sleeve can be made of cast iron and/or steel and/or light metals.

BRIEF DESCRIPTION OF THE SEVERAL VIEWS OF THE DRAWINGS

The present disclosure is explained in more detail below with reference to the figures in which:

FIG. 1 is a longitudinal view of an inventive sealing sleeve in a one-part form;

FIG. 2 is a longitudinal view of an inventive sealing sleeve in a two-part form; and, FIG. 3 is a detail view of a clip connection between a sleeve base body and a flange section.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

The figures are shown only in schematic form and are intended solely for the purpose of a better understanding of the present disclosure. Identical elements are provided with the same reference numerals. The features of individual exemplary embodiments may be interchanged.

An automatic transmission is one example of a possible application of sealing sleeve 1. Its use in transmissions, between two rotating shafts, or between shafts and clutch elements or between shafts and housings, or between clutch elements and housings is also conceivable, because sealing sleeve 1 can be used between all components that can be moved relative to each other and are to be supplied with hydraulic fluid.

Sealing sleeve 1 is disposed, for example, in a transmission. This transmission has two torque transmitting devices, which rotate relative to each other. Shell surface 2 of sealing sleeve 1 extends in the axial direction. In contrast, flange section 3 extends in the radial direction. The surface of flange section 3 that points in the direction of shell surface 2 is running surface 4. The surface is suitable for disposing axial bearing 5 on it.

The first torque transmitting device can be designed as a drive shaft. The drive shaft has a shaft shoulder, which is axially mounted relative to a housing by means of axial bearing 5. The housing may be the second torque transmitting device. A hub can be arranged radially outside of the shaft shoulder. Even this hub is a torque transmitting device. The hub can be connected in a torsion-proof manner to the shaft shoulder and, thus, also to the drive shaft, so that the hub and the drive shaft rotate relative to the housing. The housing defines a fluid chamber. The fluid chamber is provided for the purpose of supplying the hub, which can be provided with a multi-plate clutch, with hydraulic fluid. For this reason, sealing rings, such as O-rings, may be provided in two grooves. Shell surface 2 of sealing sleeve 1 provides the sealing rings with an abutment surface. This arrangement protects the fluid chamber in such a way that it is fluid tight.

FIG. 1 is a sectional view of sealing sleeve 1. This figure shows shell surface 2 and flange section 3. Shell surface 2 is a part of sleeve base body 6. On the one hand, flange section 3, which is a part of bottom unit 7, extends perpendicular to the sleeve base body. Running surface 4 forms a rolling surface for rolling bodies 8 of axial bearing 5. Rolling bodies 8 are guided by cage 9. In order to enclose cage 9 in a positive locking manner and in order to be easily attachable to the shaft shoulder, bottom unit 7 of sealing sleeve 1 has rim 10. Rim 10 extends coaxially to shell surface 2 of piston base body 6. With respect to the length of rim 10, it is configured so as to be clearly shorter in the axial direction than shell surface 2.

Furthermore, sealing sleeve 1 has hydraulic fluid passage openings 11. The hydraulic fluid passage openings 11 are formed, for example, as slots. They can be, for example, drilled/milled/punched.

FIG. 2 shows an additional exemplary embodiment of sealing sleeve 1. In this case the section, around which a frame is drawn, is shown in greater detail in the following FIG. 3. The difference with respect to the previous embodiment consists of the fact that sleeve base body 6 represents a different component than bottom unit 7. With respect to other components, such as passage holes 11, axial bearing 5, rim 10, shell surface 2 and flange section 3, the embodiment in FIG. 2 is identical to the one shown in FIG. 1.

FIG. 3 shows that hook section 12, such as nose 13, which is also a part of sleeve base body 6, makes it possible for bottom unit 7 to be inserted into sleeve body 6 by means of a clip connection. Furthermore, it holds true that rim 10 also has a hook, which is suitable for accommodating cage 9. Furthermore, FIG. 3 shows very clearly that rolling body 8 runs on running surface 4.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS 1 sealing sleeve
2 shell surface
3 flange section
4 running surface
5 axial bearing
6 sleeve base body
7 bottom unit
8 rolling body
9 cage
10 rim
11 hydraulic fluid passage opening
12 hook section
13 nose

What we claim is:

1. A sealing sleeve for use between two torque transmitting devices, which rotate relative to each other, comprising:
   a shell surface, including:
      a radially inward facing surface;
      a hook section extending radially inward from the radially inward facing surface and,
      a nose extending radially inward from the radially inward facing surface and axially displaced from the hook section in a first axial direction;
   a bottom unit, including:
      a flange section, having:
         a first end that engages the shell surface axially between the hook section and the nose;
         a second end; and,
         a running surface facing in the first axial direction; and,
      a rim extending from the second end in the first axial direction; and,
   an axial bearing operatively arranged on the running surface, the axial bearing including a cage connected to the flange section.

2. The sealing sleeve as claimed in claim 1, wherein the flange section forms a rolling surface for a rolling body of the axial bearing.

3. The sealing sleeve as claimed in claim 1, wherein the sealing sleeve is securely connected to the axial bearing.

4. The sealing sleeve as claimed in claim 1, wherein hydraulic fluid passage openings are contained in the shell surface.

5. The sealing sleeve as claimed in claim 1, wherein the shell surface, the flange section, and the rim comprise a constant thickness.

6. The sealing sleeve as claimed in claim 5, wherein the flange section and the rim form a cup-shaped, ring-shaped, and/or disk-shaped bottom unit.

7. The sealing sleeve as claimed in claim 6, wherein the bottom unit is attached to a sleeve base body in a non-positive locking manner and/or a positive locking manner and/or by material bonding.

8. The sealing sleeve as claimed in claim 1, wherein the sealing sleeve is configured in one part or two parts.

9. An automatic transmission or clutch with a first torque transmitting device and a second torque transmitting device, between which the sealing sleeve is inserted, as claimed in claim 1.

10. A sealing sleeve for use between two torque transmitting devices, which rotate relative to each other, comprising:
   a bottom unit, including:
      a flange section, having:
         a first end;
         a second end arranged radially inward of the first end; and,
         a running surface facing in a first axial direction; and,
      a rim extending from the second end in the first axial direction;
   a shell surface connected to and extending from the first end in the first axial direction; and,
   an axial bearing operatively arranged on the running surface and securely connected to the sealing sleeve.

11. The sealing sleeve as claimed in claim 10, wherein the flange section forms a rolling surface for a rolling body of the axial bearing.

12. The sealing sleeve as claimed in claim 10, wherein the flange section is connected to a cage of the axial bearing.

13. The sealing sleeve as claimed in claim 11, wherein the flange section is connected to a cage of the axial bearing.

14. The sealing sleeve as claimed in claim 10, wherein hydraulic fluid passage openings are contained in the shell surface.

15. The sealing sleeve as claimed in claim 10, wherein the shell surface, the flange section, and the rim comprise a constant thickness.

16. The sealing sleeve as claimed in claim 10, wherein the sealing sleeve is configured in one part or two parts.

17. The sealing sleeve as claimed in claim 15, wherein the flange section and the rim form a cup-shaped, ring-shaped, and/or disk-shaped bottom unit.

18. The sealing sleeve as claimed in claim 17, wherein the bottom unit is attached to a sleeve base body in a non-positive locking manner and/or a positive locking manner and/or by material bonding.

19. An automatic transmission or clutch with a first torque transmitting device and a second torque transmitting device, between which the sealing sleeve is inserted, as claimed in claim 10.

* * * * *